United States Patent
Wang et al.

(10) Patent No.: US 6,579,961 B1
(45) Date of Patent: Jun. 17, 2003

(54) ETHYLENE STYRENE INTERPOLYMERS WITH DOUBLE REVERSE STYRENE INCORPORATION

(75) Inventors: Qinyan Wang, Calgary (CA); Patrick Lam, Calgary (CA); Zengrong Zhang, Calgary (CA); Garry Yamashita, Calgary (CA); Lianyou Fan, Calgary (CA)

(73) Assignee: Nova Chemicals (International)S.A. (CH)

( * ) Notice: Subject to any disclaimer, the term of this patent is extended or adjusted under 35 U.S.C. 154(b) by 0 days.

(21) Appl. No.: 10/051,568

(22) Filed: Jan. 18, 2002

(51) Int. Cl.$^7$ .................. C08F 212/12; C08F 4/649
(52) U.S. Cl. ............. 526/347; 526/126; 526/128; 526/132; 526/133; 526/134; 526/142; 526/160; 526/282; 526/283; 526/336
(58) Field of Search .................. 526/132, 133, 526/134, 142, 160, 347, 126, 128, 145, 147, 282, 283, 336

(56) References Cited

U.S. PATENT DOCUMENTS

| | | | | |
|---|---|---|---|---|
| 5,153,157 A | | 10/1992 | Hlatky et al. | 502/117 |
| 5,387,568 A | | 2/1995 | Ewen et al. | 502/104 |
| 5,703,187 A | | 12/1997 | Timmers | 526/282 |
| 5,965,677 A | * | 10/1999 | Stephan et al. | 526/129 |
| 6,066,709 A | | 5/2000 | Arai et al. | 526/347 |
| 6,191,245 B1 | | 2/2001 | Campbell, Jr. et al. | 526/347 |
| 6,235,855 B1 | | 5/2001 | Arai et al. | 526/170 |
| 6,239,242 B1 | * | 5/2001 | Wang et al. | 526/347 |

* cited by examiner

Primary Examiner—Fred Teskin
(74) Attorney, Agent, or Firm—Kenneth H. Johnson

(57) ABSTRACT

Novel ethylene styrene interpolymers having triads with double reverse styrene incorporation (SSS) may be prepared in the presence of a transition metal phosphinimine compound and an activator.

42 Claims, 10 Drawing Sheets

ETHYLENE STYRENE INTERPOLYMERS WITH DOUBLE REVERSE STYRENE INCORPORATION

FIELD OF THE INVENTION

The present invention relates to interpolymers (including copolymers) of alpha olefins (e.g. ethylene) with one or more $C_{8-20}$ vinyl aromatic monomers (e.g. styrene), which polymers have one or more blocks of three vinyl aromatic monomers in a head to tail to tail insertion. ("SSS").

BACKGROUND OF THE INVENTION

Polymers of one or more alpha olefins are generally incompatible with polymers of one or more $C_{8-20}$ vinyl aromatic monomers. As a result, it is difficult to blend or even laminate, for example polystyrene and polyethylene. There have been a number of attempts to prepare copolymers of, for example styrene and ethylene. Such polymers could lead to two different developments. The copolymer might have the properties sought after in the blend or the copolymer may be a suitable compatibilizer so that the blend could be prepared.

U.S. Pat. No. 6,066,709 issued May 23, 2000 assigned to Denki Kagaku Kogyo, Kabushiki discloses an ethylene styrene copolymer having from 1 to 55 mole % of an isotactic ES structure having a head to tail bond structure (e.g. ESSE). The polymers of the present invention have ratios of $^{13}C$ NMR peaks at 38 ppm to 44 ppm of less than 2:1 and multiple peaks between 34 and 35 ppm indicating the polymer contains one or more blocks of three vinyl aromatic monomers in a head to tail to tail insertion. This is not disclosed or suggested by the reference.

U.S. Pat. No. 6,191,245 issued Feb. 20, 2001, to Campbell et al, assigned to the Dow Chemical Company teaches copolymers of one or more alpha olefins and one or more vinyl aromatic monomers which are substantially random (Col. 6 lines 45–48) and the tetrads occur exclusively in a 1, 2 (head to tail) manner. This teaches against the <u>SS</u> vinyl aromatic block of the present invention.

U.S. Pat. No. 5,703,187 issued Dec. 30, 1997, assigned to the Dow Chemical Company teaches pseudo random copolymers of styrene and ethylene. The specification teaches a particular distinguishing feature of pseudo random copolymers is that all the phenyl groups substituted on the polymer backbone are separated by 2 or more methylene units (Col. 13 lines 44–55). No vinyl aromatic monomer (e.g. styrene) is inserted in a head-to-tail-to-tail manner as required by the present invention.

U.S. patent application Ser. No. 6,235,855 B1 published May 22, 2001 discloses a process for producing an ethylene styrene interpolymer having isotactic styrene blocks prepared using bridged metallocene catalysts. The polymers of the present invention do not have isotactic styrene blocks and are prepared without using a bridged metallocene catalyst.

SUMMARY OF THE INVENTION

The present invention provides an interpolymer comprising:
1) from 30 to 70 weight % of one or more monomers selected from the group consisting Of $C_{2-10}$ aliphatic alpha olefins;
2) from 70 to 30 weight % of one or more monomers selected from the group consisting Of $C_{8-20}$ vinyl aromatic monomer which are unsubstituted or substituted by one or more substituents selected from the group consisting of $C_{1-4}$ alkyl radicals; and optionally;
3) from 0 to 10 weight % one or more monomers selected from the group consisting of $C_{5-9}$ non-conjugated diolefins wherein said interpolymer;
   i) contains one or more blocks of three vinyl aromatic monomers in a head to tail to tail insertion fashion (manner) characterized by having a $^{13}C$ NMR ratio of the areas under the peaks at 38 ppm to 44 ppm of less than 2:1 and multiple peaks between 34 and 35 ppm.

The present invention further provides a process for preparing the above interpolymer comprising contacting a monomer mixture comprising from 0.8 to 0.6 mole fraction of one or more $C_{8-20}$ vinyl aromatic monomer which are unsubstituted or substituted by one or more substituents selected from the group consisting of $C_{1-4}$ alkyl radicals; from 0.4 to 0.2 mole fraction of one or more monomers selected from the group consisting of $C_{2-10}$ aliphatic alpha olefins and optionally from 0 to less than 0.1 mole fraction one or more monomers selected from the group consisting of $C_{5-9}$ non-conjugated diolefins with a catalyst comprising a phosphinimine compound of the formula;

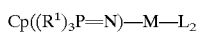

$$Cp((R^1)_3P\!=\!N)\!-\!M\!-\!L_2$$

wherein each $R^1$ is independently selected from the group consisting of $C_{3-6}$ alkyl radicals which are unsubstituted or substituted by a heteroatom, provided that there is a carbon phosphorus bond and the CPN bond angle is not less than 108°, Cp is selected from the group consisting of a cyclopentadienyl, indenyl and fluorenyl radicals which are unsubstituted or substituted by one or more substitutents selected from the group consisting of $C_{1-6}$ alkyl radicals which are unsubstituted or substituted by one or more fluorine atoms; M is selected from the group consisting of Ti, Zr, and Hf, and each L is independently selected from the group consisting of a halogen atom, a hydrogen atom, a $C_{1-10}$ alkyl radical, a $C_{1-10}$ alkoxide radical, and a $C_{6-10}$ aryl oxide radical, and at least one activator selected from the group consisting of:
   (i) a mixture comprising a complex aluminum compound of the formula $R^2{}_2AlO(R^2AlO)_mAlR^2{}_2$ wherein each $R^2$ is independently selected from the group consisting of $C_{1-20}$ hydrocarbyl radicals and m is from 3 to 50, and a hindered phenol to provide a molar ratio of Al: hindered phenol from 2:1 to 5:1;
   (ii) ionic activators selected from the group consisting of:
   (A) compounds of the formula $[R^3]^+[B(R^4)_4]^-$ wherein B is a boron atom, $R^3$ is a cyclic $C_{5-7}$ aromatic cation or a triphenyl methyl cation and each $R^4$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $-\!Si\!-\!(R^5)_3$; wherein each $R^5$ is independently selected from the group consisting of a hydrogen atom and a $C_{1-4}$ alkyl radical;
   (B) compounds of the formula $[(R^8)_tZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and
   (C) compounds of the formula $B(R^4)_3$ wherein $R^4$ is as defined above; and
   (iii) mixtures of (i) and (ii); in an inert hydrocarbyl medium at a temperature from 20° C. to 150° C. and a pressure from 15 psi to 15000 psi.

DETAILED DESCRIPTION

BEST MODE FOR CARRYING OUT THE INVENTION

Figure 1:
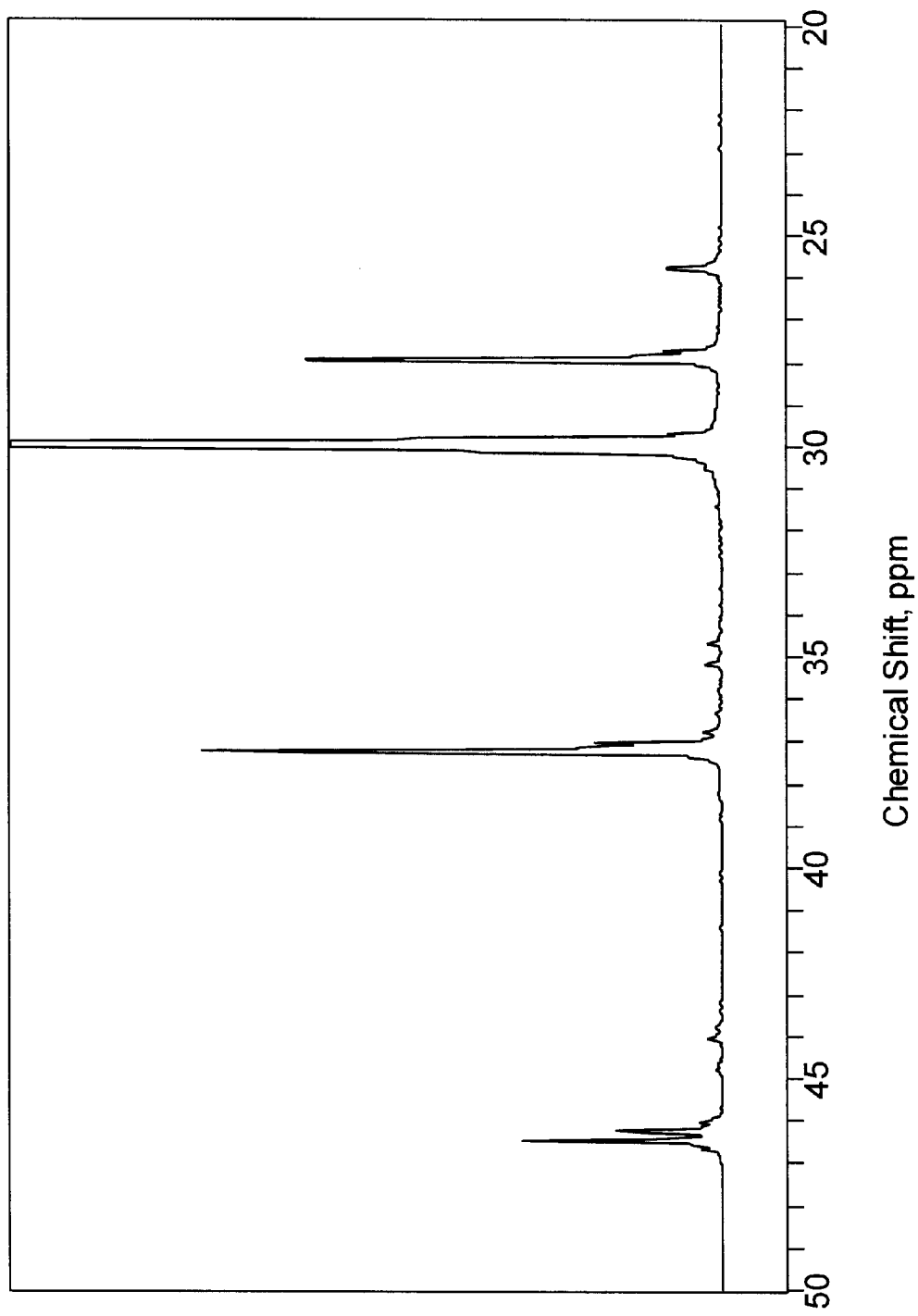
FIG. 1 is a $^{13}$C NMR spectrum of the ethylene styrene interpolymer produced according to Example 1 (after atactic polystyrene removal).

For the purposes of this specification a $^{13}$C NMR peak means a signal having a signal-to-noise ratio of at least three.

As used in this specification $\underline{S}$ means a vinyl aromatic monomer inserted in a reverse manner (e.g. tail insertion).

The present invention relates to interpolymers of one or more $C_{2-10}$, aliphatic alpha olefins, preferably selected from the group consisting of ethylene, propylene, butene, hexene and octene, most preferably ethylene and propylene, and one or more $C_{8-20}$, preferably $C_{8-12}$ vinyl aromatic monomers which are unsubstituted or substituted by a $C_{1-4}$ alkyl radical. The vinyl aromatic monomer may be selected from the group consisting of styrene, alpha methyl styrene and p-methyl styrene. Preferably, the vinyl aromatic monomer is styrene.

The polymers of the present invention generally comprise from 30 to 70, preferably from 40 to 60, most preferably from 40 to 55 weight % of one or more aliphatic alpha olefins and from 70 to 30, preferably from 60 to 40, most preferably from 60 to 45 weight % of vinyl aromatic monomer and optionally from 0 to 10, preferably from 5 to 10 weight % of one or more $C_{5-9}$ non-conjugated diolefin monomers.

The non-conjugated diolefin monomers may be selected from the group consisting of hexadiene and ethylidene norbornene, preferably 1,5-hexadiene.

The polymers of the present invention will have a weight average molecular weight from 10,000 to 500,000 typically from 80,000 to 350,000, preferably from 100,000 to 300,000.

The polymers of the present invention generally do not contain a peak for $^{13}$C NMR at a shift (relative to TMS) of about 40.8 to 41.0 ppm (syndiotactic) or 40.5 to 41.0 ppm (atactic polystyrene). The $^{13}$C NMR spectra of the polymers do not have a peak near 40 to 41 ppm, indicating no isotactic polystyrene blocks is present. The $^{13}$C NMR spectra also have small peaks at about 34 to 34.5 ppm and 34.5 to 35.2 ppm, generally attributed to styrene tail-to-tail insertion within the polymer.

The presence of an isolated styrene unit in a backbone structure of ethylene units yields resonances at 46.2 ppm, 37.2 ppm, 30.0 ppm, and 27.9 ppm which arise from, the Tδδ methine carbons, Sαδ methylene carbons, the Sδδ backbone carbons, and the Sβδ methylene carbons, respectively. A resonance at 25.7 ppm is indicative of Sββ methylene carbons found in styrene-ethylene-styrene triads and the corresponding Sαγ methylene carbons are observed at about 37 ppm. The chain structure which arises from ethylene units containing tail-to-tail insertion of styrene leads to the presence of resonances from the Sαβ methylenes at about 34.0 to 34.5 ppm and 34.5 to 35.2 ppm as outlined in U.S. Pat. No. 5,703,187.

To confirm $^{13}$C-NMR peak assignment, the $^{13}$C NMR chemical shifts of random ethylene/styrene copolymer chains have been simulated based on the formula of Grant and Paul (D. M. Grant and E. G. Paul, *J. Am. Chem. Soc.* 86, 2984 (1964)). The phenyl groups of styrene were treated as substituents, the parameters of which were refined to reproduce the $^{13}$C NMR of model compounds. The $^{13}$C NMR chemical shifts of all possible pentads, except those that include head-to-head styrene dyads, in a random ethylene/ styrene copolymer chain have been calculated. Table 1 summarizes the assignments of the experimental NMR results based on the NMR simulation results.

TABLE 1

| | Assignment of experimental NMR (unit in ppm) | | | | | | | | |
|---|---|---|---|---|---|---|---|---|---|
| Polymer of Example 1 Observed | 46.5 | 44.7 | 44.0 | 38.5 | 37.2 | 35.1 & 34.6 | 30.0 | 27.9 | 25.8 |
| Calculated Assignment | 46.30~46.72 CH, ESE or ES$\underline{S}$ | 44.32~44.72 CH$_2$, ES$\underline{S}$ | 44.00~44.32 CH, SS: ESS, SSE or SSS | 37.6~37.9 CH$_2$, SSE | 37.3~37.7 CH$_2$, C$_2$, SES, C$_2$, EES, C$_1$, $\underline{S}$EE, CH$_2$ ESE | 35.00~35.42 CH$_2$, $\underline{SS}$: ES$\underline{S}$ or S$\underline{SS}$; C$_1$ & C$_2$, $\underline{S}$ES =S$\underline{S}$ | 30.3~30.9 C$_1$ & C$_2$, EEE; C$_1$, EE$\underline{S}$or C$_2$, SEE | 28.3~28.4 C$_2$, EE$\underline{S}$ or C$_1$, SEE | 25.7~25.9 C$_1$, SES |

Note:
CH refers to the methine for a styrene central carbon;
CH$_2$ refers to the methylene for a styrene central carbon.
C$_1$ refers to the methine for an ethylene central carbon;
C$_2$ refers to the methylene for an ethylene central carbon.

In the spectrum for the current invention, the presence of minor resonances adjacent to these peaks, at about 35.1 and 35.0 ppm as well as at 34.6 and 34.5 ppm, demonstrates that the tail-to-tail styrene units are in a somewhat different chemical environment, most likely from neighbouring styrene units. Based on simulations, adjacent styrene units leads to the presence of resonances at about 35.0 ppm and at 34.5 ppm.

Figure 2:
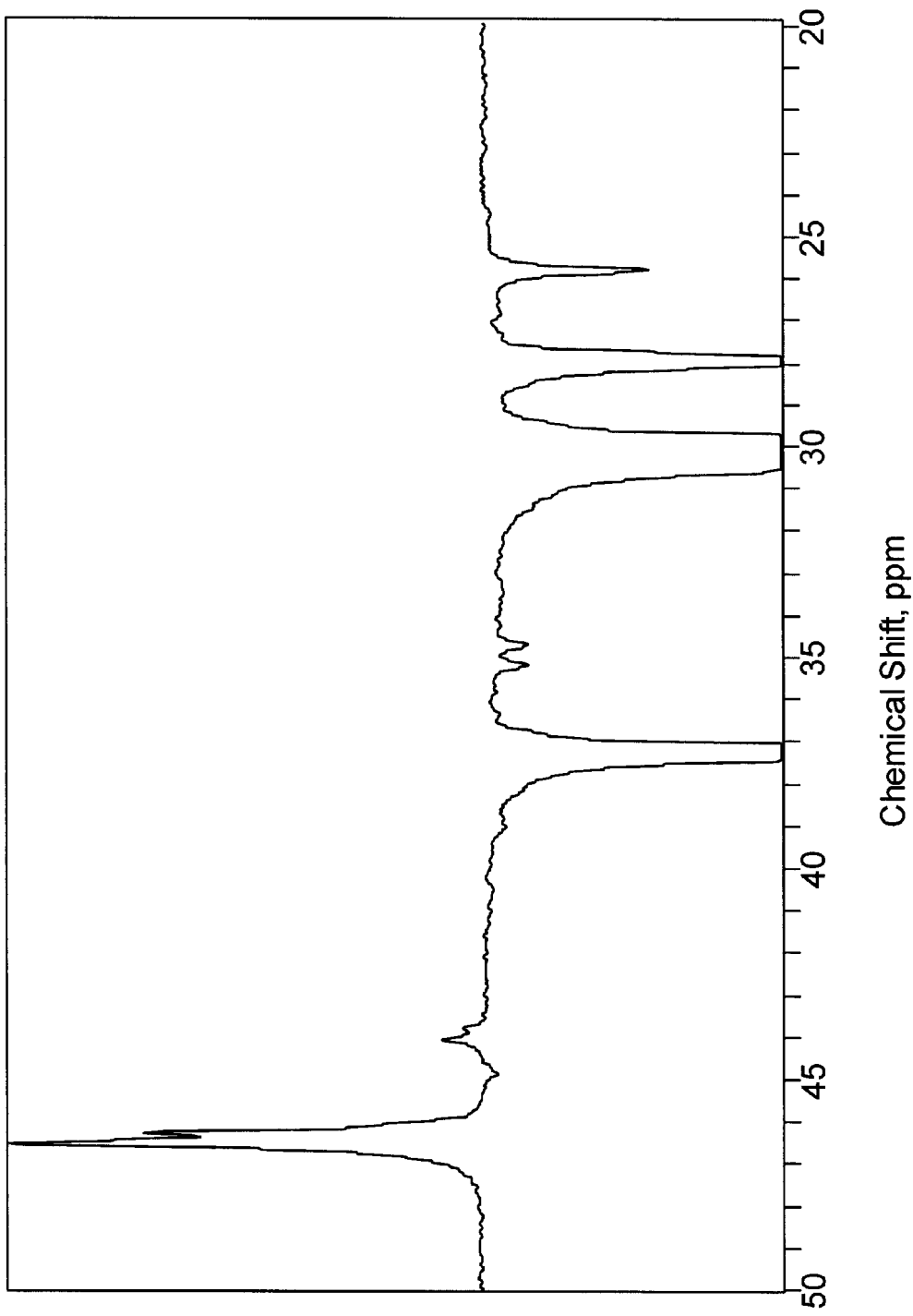
FIG. 2 is a Distortionless Enhanced Polarization Transfer $^{13}$C NMR spectrum of the ethylene styrene produced according to Example 1 (after atactic polystyrene removal).
Figure 3:
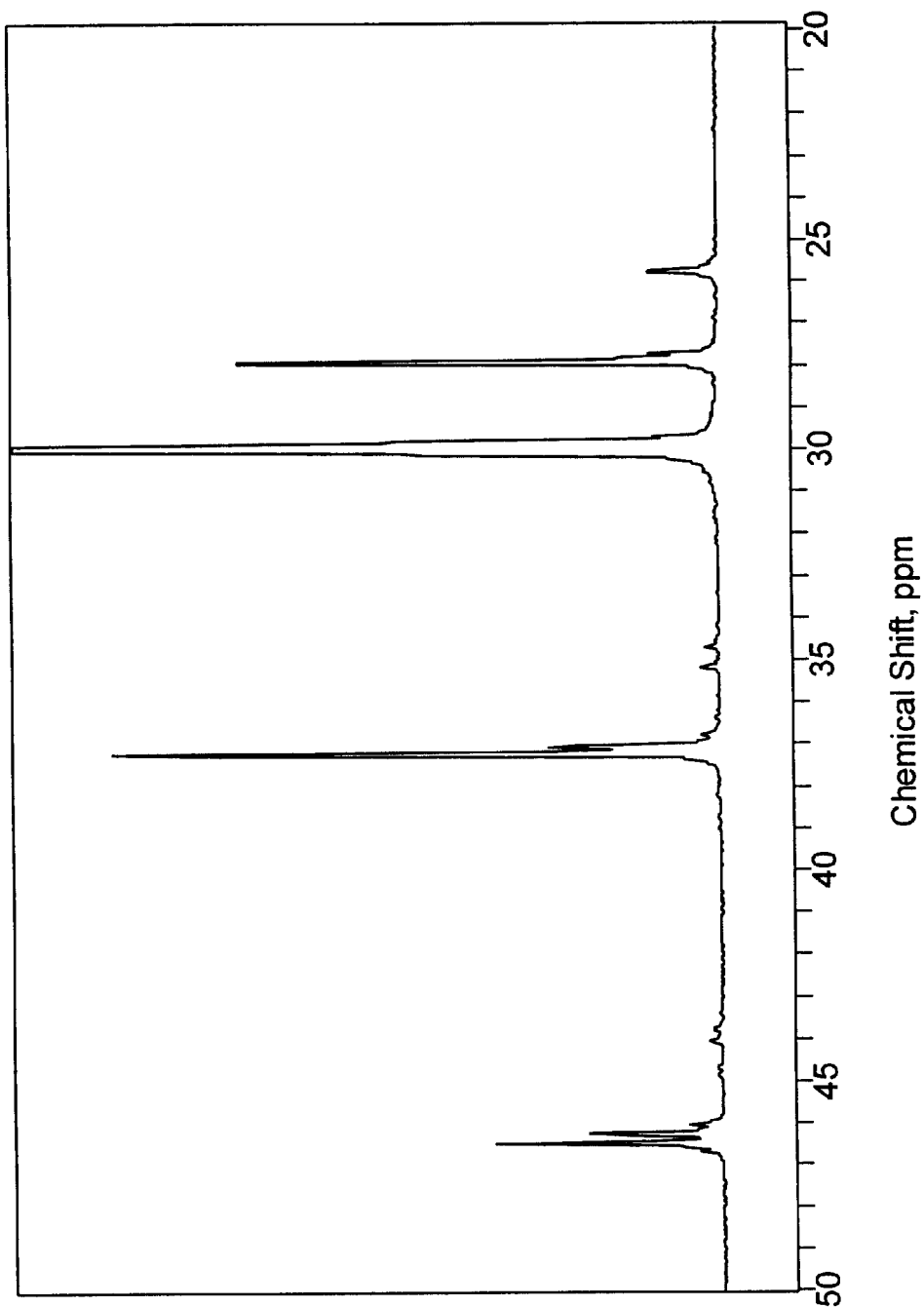
FIG. 3 is a $^{13}$C NMR spectrum of the ethylene styrene interpolymer produced according to Example 3 (after atactic polystyrene removal).
Figure 4:
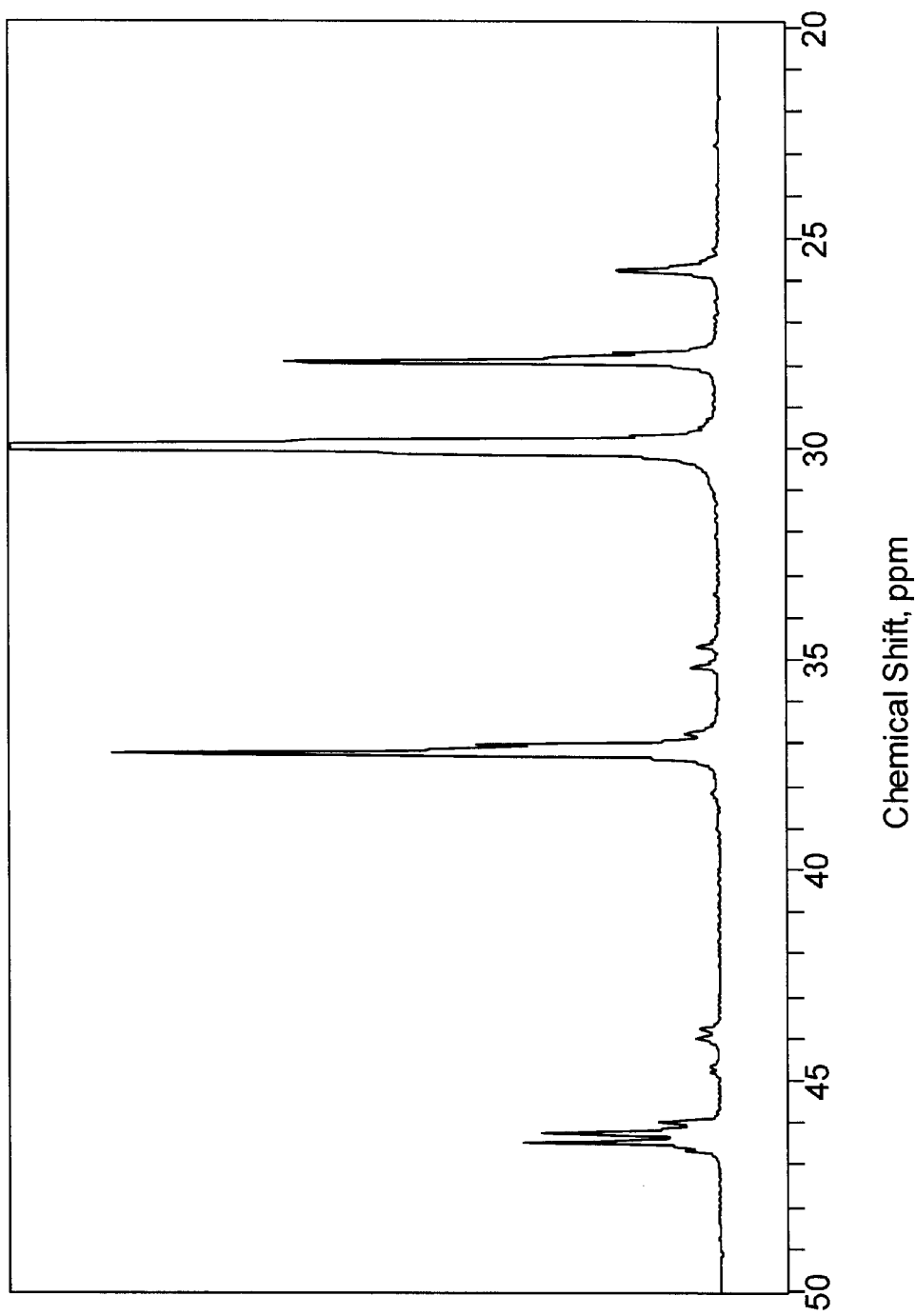
FIG. 4 is a $^{13}$C NMR spectrum of the ethylene styrene interpolymer produced according to Example 4 (after atactic polystyrene removal).
Figure 5:
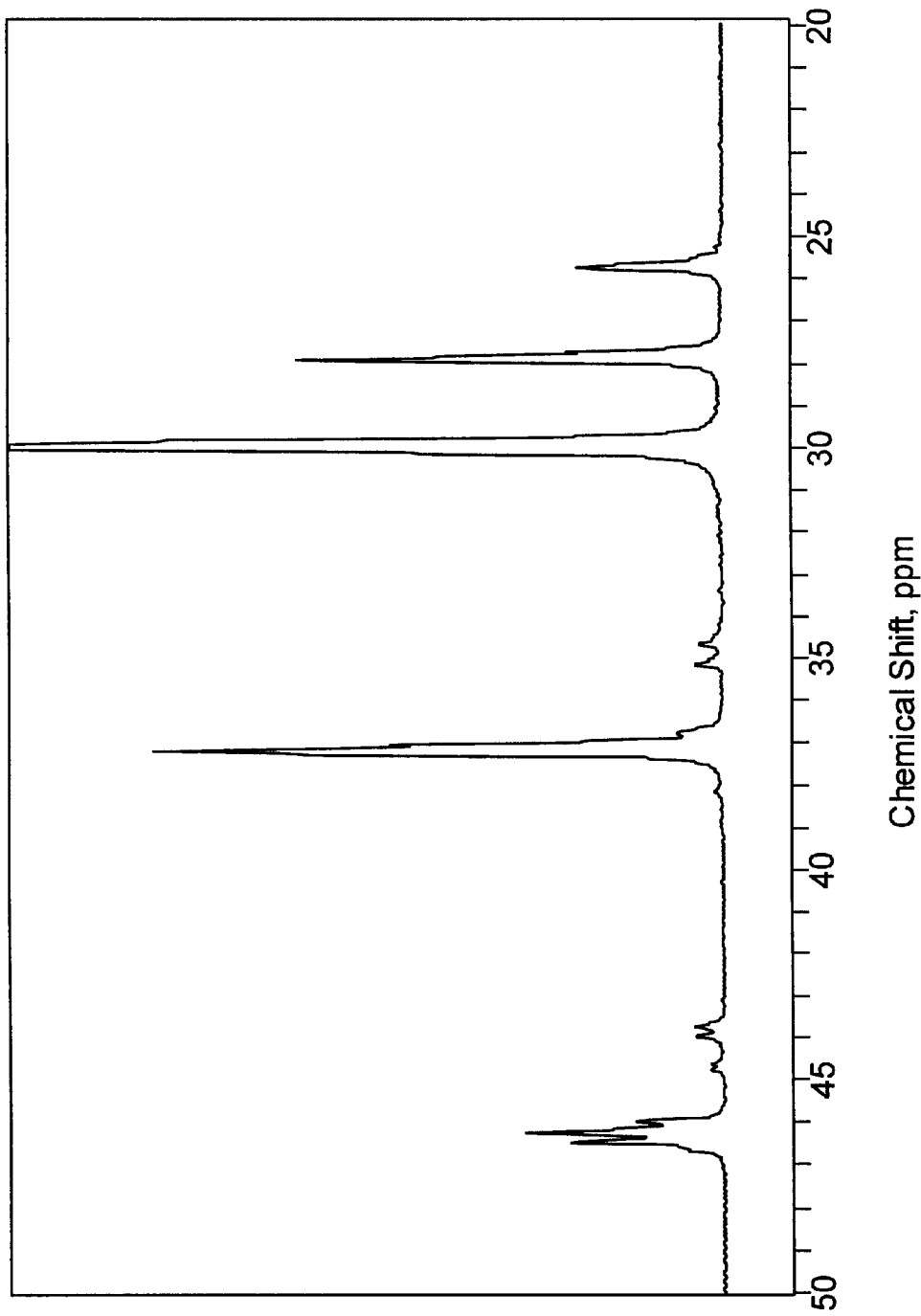
FIG. 5 is a $^{13}$C NMR spectrum of the ethylene styrene interpolymer produced according to Example 5 (after atactic polystyrene removal).
Figure 6:
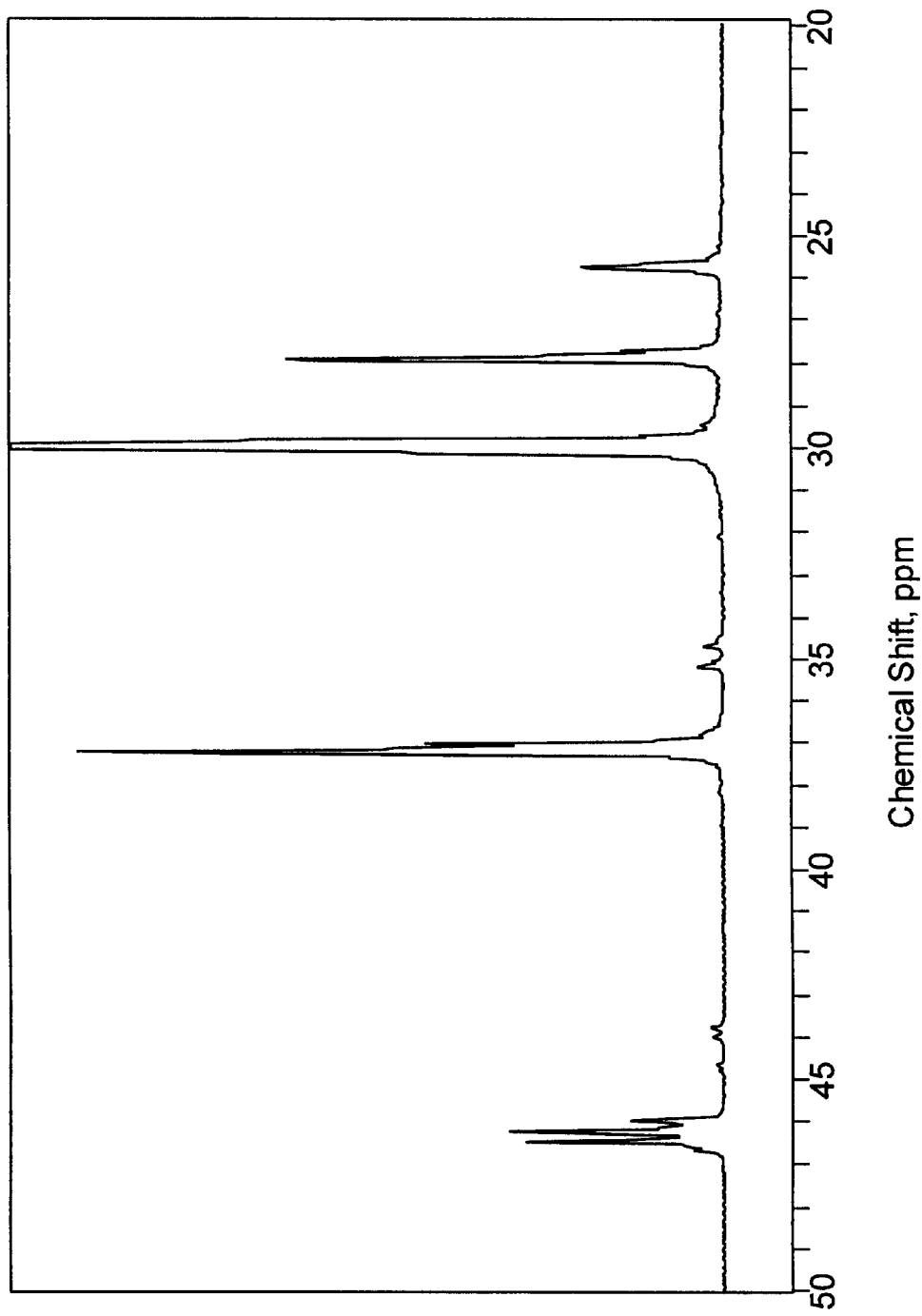
FIG. 6 is a $^{13}$C NMR spectrum of the ethylene styrene interpolymer produced according to Example 8 (after atactic polystyrene removal).
Figure 7:
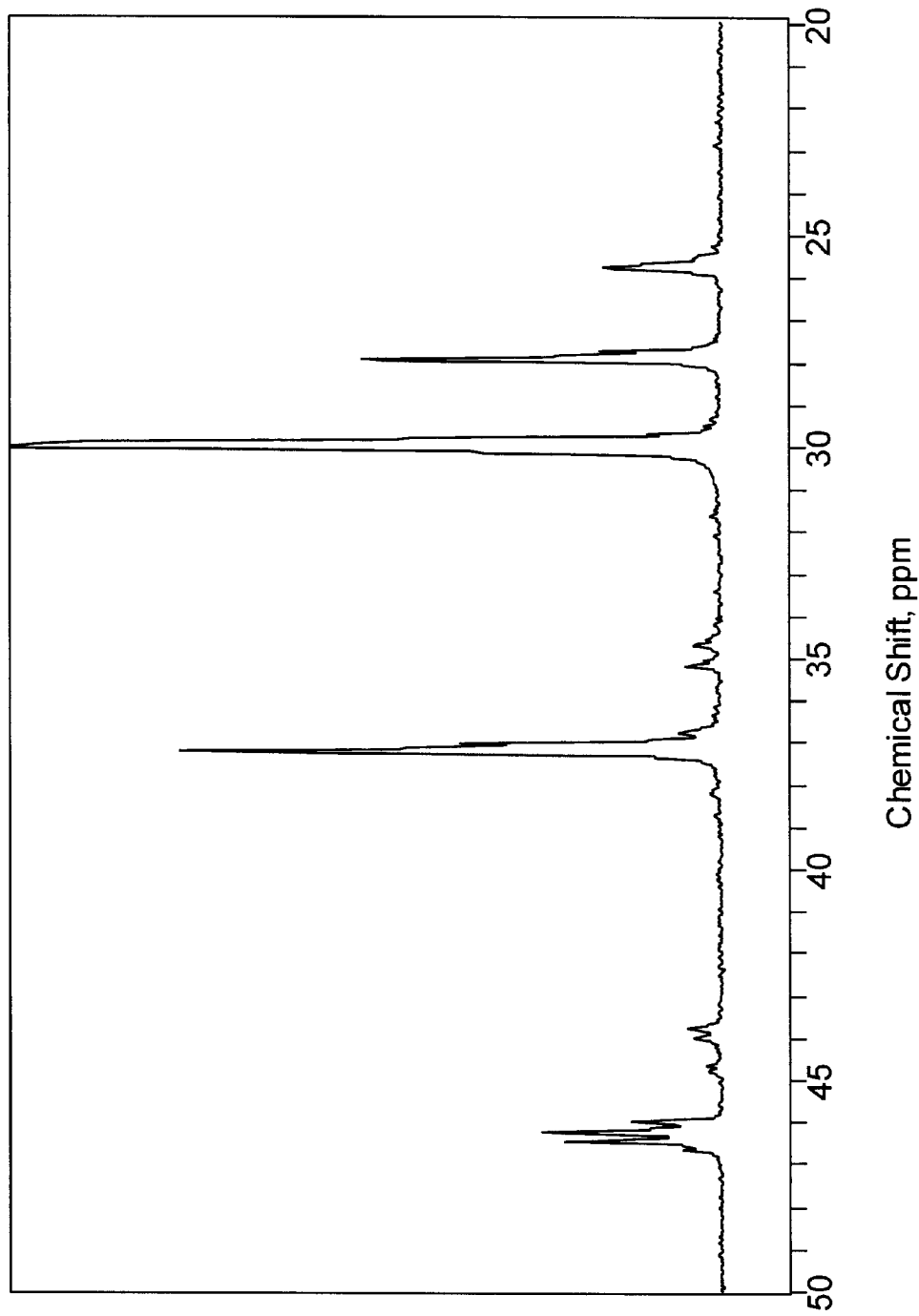
FIG. 7 is a $^{13}$C NMR spectrum of the ethylene styrene interpolymer produced according to Example 16 (after atactic polystyrene removal).
Figure 8:
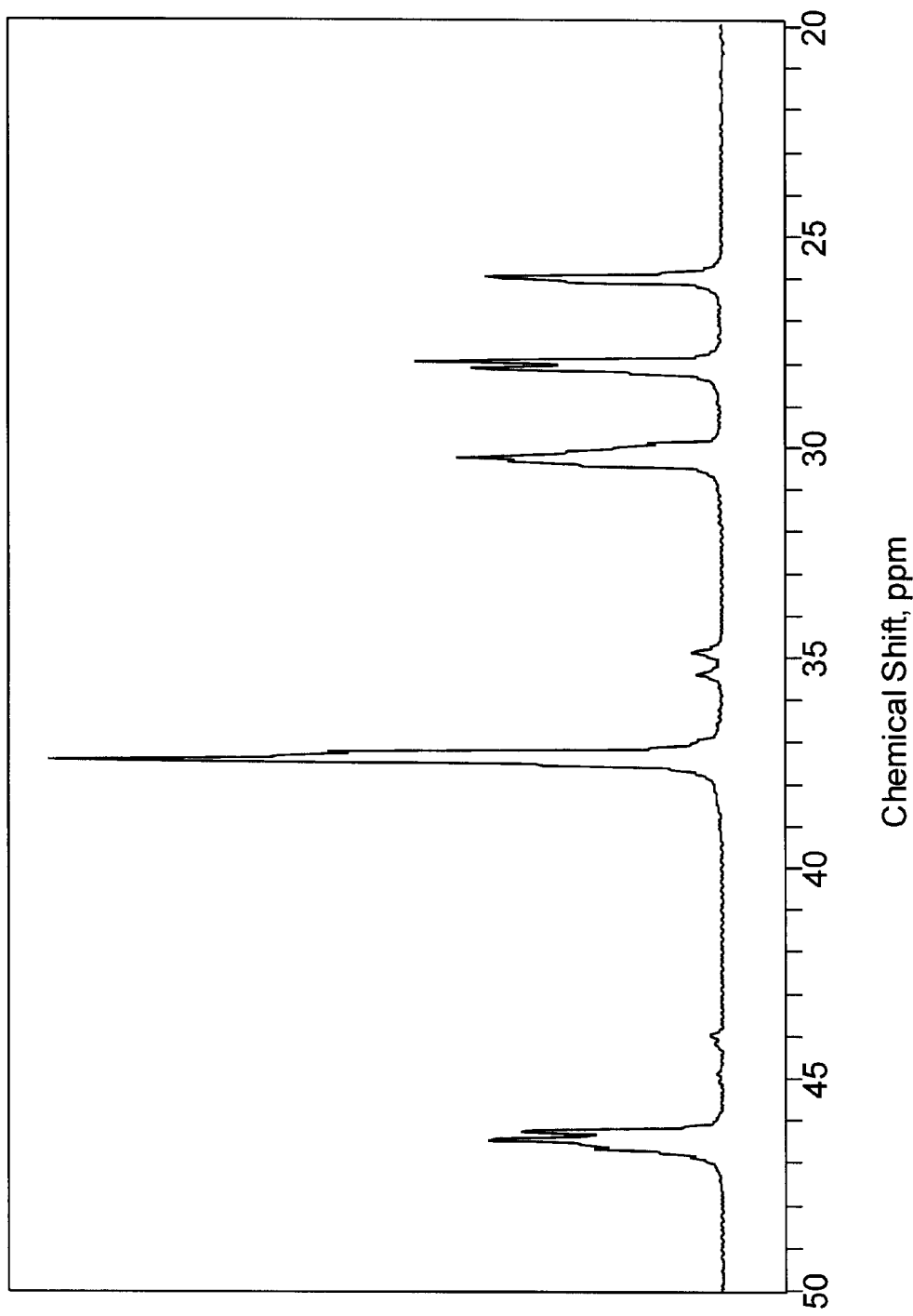
FIG. 8 is a $^{13}$C NMR spectrum of the ethylene styrene interpolymer produced according to comparative Example 17 (after atactic polystyrene removal).

It is known that ESSE tetrads are indicated by resonances at about 44.1 ppm, 43.9 ppm and 38.2 ppm (U.S. Pat. No. 6,191,245 B1) wherein the resonances between 43.7 ppm and 44.25 ppm are from methine carbons and resonances in the region of 38.0 to 38.5 ppm are from methylene carbons. FIG. 2 shows the spectrum from the DEPT experiment for the current invention. ESSE tetrads are evident in the spectrum by the resonances listed above. As well, the resonances at 44.6 and 44.8 ppm can be attributed to the Sαα methylene carbons which bridge the two phenyl rings. Theoretically, the ESSE structure should produce a 2:1 ratio for the integral areas for the outer Sαδ methylene carbon resonance with respect to the central methylene Sαα. The ratio for the current invention is much less than 2:1 and even less than 1:1 which would suggest that alternate structures are present which change the symmetrical nature of the ESSE tetrad. Some of the ESS must be connected to reversed styrene to form a new structure ESSS. This structure was confirmed by additional signals at 34.5 and 35.0 ppm. The Sαβ methylene resonances for styrene tail-to-tail insertion in pseudo random interpolymers described in U.S. Pat. No. 5,703,187 appeared at 34.7 and 35.2 ppm (ES<u>SE</u>).

Figure 9:
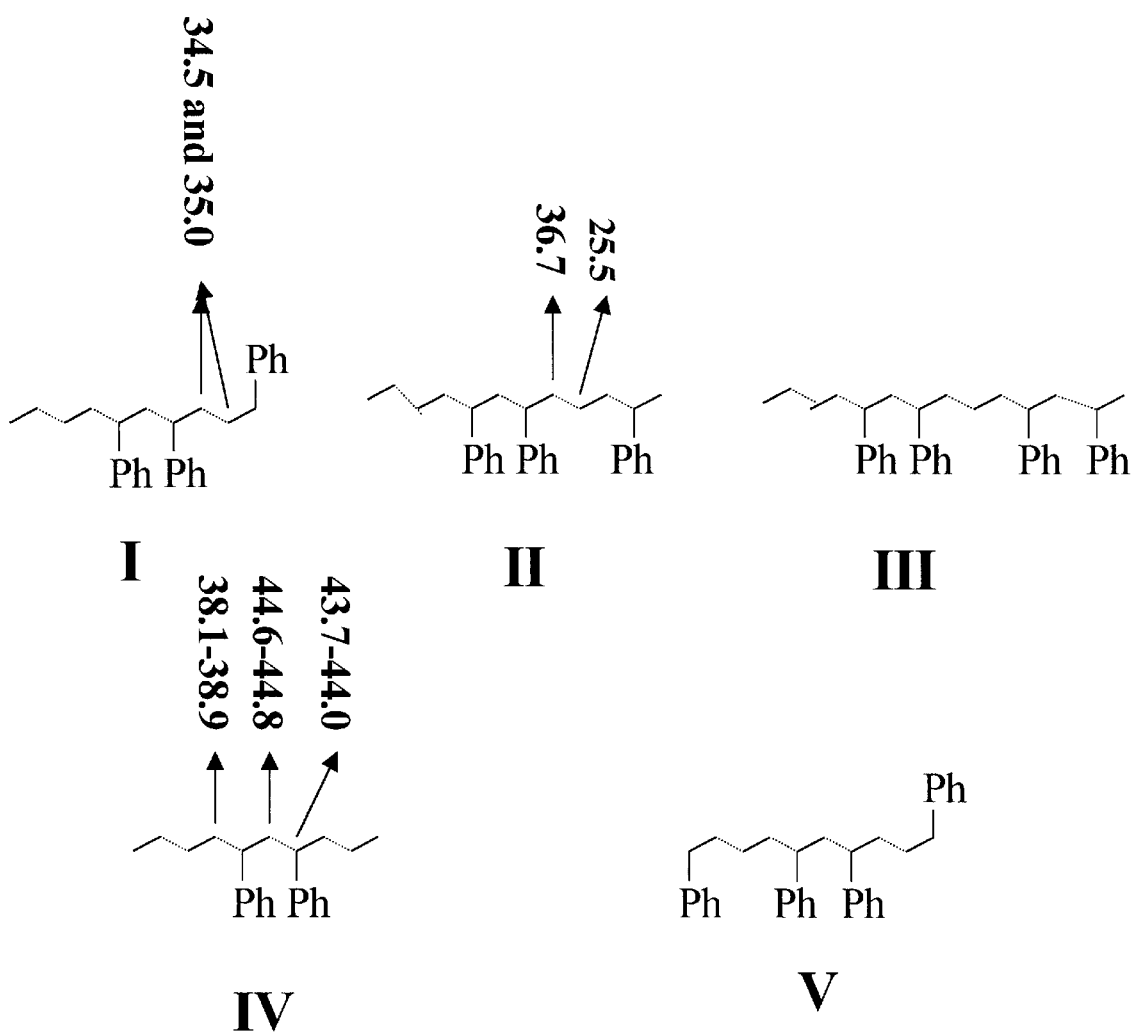
FIG. 9 is shows possible ethylene styrene microstructures and the related NMR peak assignments.
Figure 10:
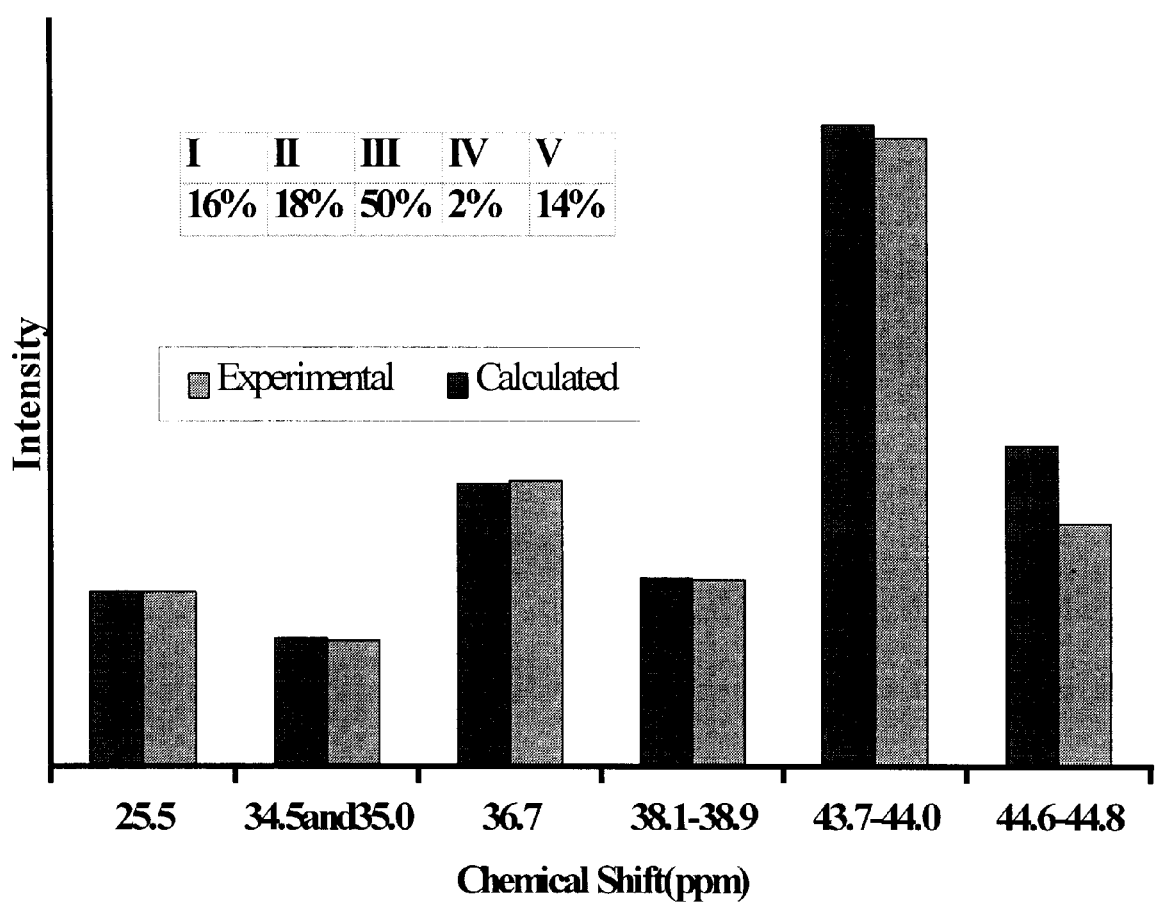
FIG. 10 shows the agreement between the calculated peak NMR intensities and the actual NMR peak intensities for the polymer of Example 1.

Shown in FIG. 9 are possible structures (I to V) and the related peak assignments. A combination of possible structures for polymer of Example 1 is shown in FIG. 9. The calculated intensities for the resonances at 44.6–44.8, 43.7–44.0, 38.1–38.9, 36.7, 34.5 and 35.0 ppm, as well as 25.5 ppm, are compared with those obtained experimentally. There is a good agreement between the experimental results and the calculated data (FIG. 10).

TABLE 2

Assignments of SES

—CH$_2$—CH$_2$—CH—C$\underset{a}{\overset{H_2}{|}}$—C$\underset{b}{\overset{H_2}{|}}$—C$\underset{c}{\overset{H_2}{|}}$—CH—C$\underset{a}{\overset{H_2}{|}}$—CH$_2$—
 |Ph                                                                                          |Ph

| Assignment | Chemical shifts (ppm) in U.S. Pat. No. 6235855 | Chemicals shifts (ppm) for polymer of Example 1 |
|---|---|---|
| a | 44.8–45.4 | 46.0–46.5 |
| b | 36.4–36.5 | 37.0–37.2 |
| c | 25.1–25.2 | 25.7–25.8 |

TABLE 3

Assignments of SSES

—CH$\underset{j}{|}$—CH$_2$—CH$\underset{j}{|}$—C$\underset{l}{\overset{H_2}{|}}$—C$\overset{H_2}{|}$—C$\overset{H_2}{|}$—CH—C$\overset{H_2}{|}$—CH$_2$—
 Ph            Ph                  m                Ph

| Assignment | Chemical shifts (ppm) in U.S. Pat. No. 6235855 | Chemicals shifts (ppm) for polymer of Example 1 |
|---|---|---|
| j | 42.4–43.0 | 43.7–44.0 |
| k | 43.7–44.5 | 44.6–44.8 |

TABLE 3-continued

Assignments of SSES

—CH$\underset{j}{|}$—CH$_2$—CH$\underset{j}{|}$—C$\underset{l}{\overset{H_2}{|}}$—C$\overset{H_2}{|}$—C$\overset{H_2}{|}$—CH—C$\overset{H_2}{|}$—CH$_2$—
 Ph            Ph                  m                Ph

| Assignment | Chemical shifts (ppm) in U.S. Pat. No. 6235855 | Chemicals shifts (ppm) for polymer of Example 1 |
|---|---|---|
| l | 35.6–36.1 | 36.7–36.8 |
| m | 24.0–25.1 | 25.4–25.6 |

Comparing the Sαγ resonances in SSES to SES for polymer of Example 1, upfield shifts of between 0.4 to 0.8 ppm were observed, which is consistent with the reported value in U.S. Pat. No. 6,235,855. This observation suggests that the styrene adjacent to the SES causes the upfield shifts of the Sαγ methylene resonance. A pair of resonances for Sαβ which also shifted upfield were observed in our case. We propose that an adjacent styrene must be present as indicated in the following figure.

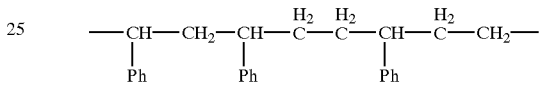

The polymers of the present invention may be prepared by solution or slurry polymerization of the monomers in the presence of a catalyst comprising a phosphinimine compound of the formula:

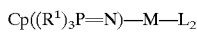

wherein each $R^1$ is independently selected from the group consisting of $C_{3-6}$ alkyl radicals which are unsubstituted or substituted by a heteroatom, provided that there is a carbon phosphorus bond and the CPN bond angle is not less than 108°, preferably not less than 108.5°; Cp is selected from the group consisting of a cyclopentadienyl, indenyl and fluorenyl radicals which are unsubstituted or substituted by one or more substitutents selected from the group consisting of $C_{1-6}$ alkyl radicals which are unsubstituted or substituted by one or more fluorine atoms; M is selected from the group consisting of Ti, Zr, and Hf, preferably Ti, and each L is independently selected from the group consisting of a halogen atom, a hydrogen atom, a $C_{1-10}$ alkyl radical, a $C_{1-10}$ alkoxide radical, and a $C_{6-10}$ aryl oxide radical, and at least one activator selected from the group consisting of:

(i) a mixture comprising a complex aluminum compound of the formula $R^2{}_2AlO(R^2AlO)_mAlR^2{}_2$ wherein each $R^2$ is independently selected from the group consisting of $C_{1-20}$ hydrocarbyl radicals and m is from 3 to 50, and a hindered phenol to provide a molar ratio of Al: hindered phenol from 2:1 to 5:1;

(ii) ionic activators selected from the group consisting of:
(A) compounds of the formula $[R^3]^+[B(R^4)_4]^-$ wherein B is a boron atom, $R^3$ is a cyclic $C_{5-7}$ aromatic cation or a triphenyl methyl cation and each $R^4$ is independently selected from the group consisting of phenyl radicals which are unsubstituted or substituted with 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^5)_3$; wherein each $R^5$ is independently selected from the group consisting of a hydrogen atom and a $C_{1-4}$ alkyl radical; and (B) compounds of the formula $[(R^8)_tZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and (C) compounds of the formula $B(R^4)_3$ wherein $R^4$ is as defined above; and (iii) mixtures of (i) and (ii); in an inert hydrocarbyl medium at a temperature from −40° C. to 160° C., preferably from 20° C. to 150° C. and a pressure from 15 psi to 15,000 psi, preferably from 15 psi to 600 psi. The polymerization may take place at temperatures from about 20° C. to about 150° C., most preferably from about 60° C. to about 120° C. and at pressures from about 15 psi (103 KPa) up to about 600 psi (4,137 KPa), most preferably from about 50 psi (345 Kpa) to 600 psi.

The polymerization may be conducted in the presence of an inert solvent or diluent. Suitable solvents or diluents are hydrocarbons having from about 5 to 12 carbon atoms or mixtures thereof. These compounds include pentane, hexane, heptane, octane, cyclohexane, methylcyclohexane, benzene, toluene, and hydrogenated naphtha. A commercially available hydrocarbon is ISOPARO®E (a $C_{5-12}$ aliphatic solvent sold by EXXON Chemical Co.).

In the phosphinimine complex preferably, wherein $R^1$ is a $C_{3-6}$ branched or cyclic alkyl radical (e.g. isopropyl, isobutyl, cyclohexyl etc.), L is selected from the group consisting of a hydrogen atom, a chlorine atom and a $C_{1-4}$ alkyl radical. Preferably Cp is selected from the group consisting of a cyclopentadienyl radical, an indenyl radical and a fluorenyl radical.

In the aluminum compound preferably, $R^2$ is a methyl radical and m is from 10 to 40. The preferred molar ratio of Al: hindered phenol is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethyl-phenol.

The "ionic activator" may abstract one activatable ligand so as to ionize the catalyst center into a cation, but not to covalently bond with the catalyst and to provide sufficient distance between the catalyst and the ionizing activator to permit a polymerizable olefin to enter the resulting active site.

Examples of ionic activators include:
  triethylammonium tetra(phenyl)boron,
  tripropylammonium tetra(phenyl)boron,
  tri(n-butyl)ammonium tetra(phenyl)boron,
  trimethylammonium tetra(p-tolyl)boron,
  trimethylammonium tetra(o-tolyl)boron,
  tributylammonium tetra(pentafluorophenyl)boron,
  tripropylammonium tetra(o,p-dimethylphenyl)boron,
  tributylammonium tetra(m,m-dimethylphenyl)boron,
  tributylammonium tetra(p-trifluoromethylphenyl)boron,
  tributylammonium tetra(pentafluorophenyl)boron,
  tri(n-butyl)ammonium tetra(o-tolyl)boron,
  N,N-dimethylanilinium tetra(phenyl)boron,
  N,N-diethylanilinium tetra(phenyl)boron,
  N,N-diethylanilinium tetra(phenyl)n-butylboron,
  di-(isopropyl)ammonium tetra(pentafluorophenyl)boron,
  dicyclohexylammonium tetra(phenyl)boron,
  triphenyl phosphonium tetra(phenyl)boron,
  tri(methylphenyl)phosphonium tetra(phenyl)boron,
  tri(dimethylphenyl)phosphonium tetra(phenyl)boron,
  tropillium tetrakispentafluorophenyl borate,
  triphenylmethylium tetrakispentafluorophenyl borate,
  tropillium phenyltrispentafluorophenyl borate,
  triphenylmethylium phenyltrispentafluorophenyl borate,
  benzene(diazonium)phenyltrispentafluorophenyl borate,
  tropillium tetrakis(2,3,5,6-tetrafluorophenyl)borate,
  triphenylmethylium tetrakis(2,3,5,6-tetrafluorophenyl) borate,
  tropillium tetrakis(3,4,5-trifluorophenyl)borate,
  benzene(diazonium)tetrakis(3,4,5-trifluorophenyl)borate,
  tropillium tetrakis(1,2,2Atrifluoroethenyl)borate,
  triphenylmethylium tetrakis(1,2,2-trifluoroethenyl) borate,
  tropillium tetrakis(2,3,4,5-tetrafluorophenyl)borate, and
  triphenylmethylium tetrakis(2,3,4,5-tetrafluorophenyl) borate.

Readily commercially available ionic activators include:
  N,N-dimethylaniliumtetrakispentafluorophenyl borate;
  triphenylmethylium tetrakispentafluorophenyl borate (tritylborate); and
  trispentafluorophenyl borane.

The aluminum compounds (alumoxanes and hindered phenol) are typically used in substantial molar excess compared to the amount of metal in the catalyst. Aluminum:transition metal molar ratios of from 10:1 to 10,000:1 are preferred, especially from 50:1 to 500:1.

Another type of activator contains a substantially non-coordinating anion". As used herein, the term substantially non-coordinating anions ("SNCA") are well known components of activator systems which are described, for example, in U.S. Pat. No. 5,153,157 (Hlatky and Turner), and the carbonium, sulfonium and oxonium analogues of such activators which are disclosed by Ewen in U.S. Pat. No. 5,387,568. In general, these SNCA are only weakly coordinated to a cationic form of the catalyst.

If the phosphinimine compound is activated only with the ionic activator the molar ratio of transition metal to boron will be from 1:1 to 1:3 preferably from 1:1.05 to 1:1.20.

In a preferred embodiment of the present invention the catalyst is a combination of a phosphinimine compound, an aluminum compound with a hindered phenol and an ionic activator. Generally such a catalyst system has a molar ratio of transition metal (e.g. Ti): Al: boron from 1:20:1 to 1:120:3, preferably 1:30:1 to 1:45:1.5, most preferably from 1:38:1 to 1:42:1.5.

The resulting polymer is then recovered and separated from the solvent and then devolatilized using conventional techniques.

The resulting polymer typically will have a molecular weight (weight average Mw) from about 10,000 to about 500,000. The polymer may be compounded with conventional heat and light stabilizers (antioxidants) and UV stabilizers in conventional amounts. Typically the antioxidant may comprise a hindered phenol and a secondary antioxidant generally in a weight ratio of about 0.5:1 to 5:1 and the total amount of antioxidant may be from 200 to 3000 ppm. Generally, the UV stabilizer may be used in amounts from 100 to 1000 ppm.

The present invention will now be illustrated by the following non-limiting examples in which, unless otherwise specified, parts means parts by weight (e.g. grams) and % means weight percent.

In the examples the following abbreviations have been used.

Tg: polymer glass transition temperature

Tm: polymer melting temperature

St: styrene

C2: ethylene

DSC: differential scanning calorimetry.

PD: polydispersity is defined as weight average molecular weight (Mw) divided by number average molecular weight (Mn).

GPC: gel permeation chromatography.

MeOH: methanol.

PMAO-IP: a type of polymethylaluminoxane.

MEK: methyl ethyl ketone

PMAO-IP was purchased from Akzo-Nobel containing 12.7 wt % of Al. $[CPh_3][B(C_6F_5)_4]$ was purchased from Asahi Glass Inc.; lot #: 980224. HPLC grade hexane was purchased from Aldrich and was purified by contact with various absorption media. Cyclohexane was obtained from NOVA's internal source and was purified further by contact with various absorption media. Toluene was purchased from Aldrich and was purified by passing through various absorption media. Toluene was used as a dilution solvent for catalyst/cocatalyst. Styrene was obtained from NOVA's internal styrene plant with about 15 ppm of t-butyl catechol. Hydrogen and ethylene were purchased from Praxair as UHP and polymer grade, respectively. $CpTiNPiPr_3Cl_2$ $(Me_2)/CpTiNPCy_3Cl_2(Me_2)$ were prepared in-house according to the procedure disclosed in Organometallics 1999, 18, 1116–1118. MAO solution: PMAO-IP and 2,6-di-t-butyl-4 ethyl-phenol were dissolved in toluene with Al/phenol molar ratio=3.25.

General Description of Feed Stream and Styrene Purification

As are known to those skilled in the art, all the feed streams were purified prior to feeding into the reactor by contact with various absorption media to remove catalyst-killing impurities such as water, oxygen, sulfur and polar materials. A purification column packed with DD-2 alumina from Alcoa was used to remove the inhibitor in styrene. Passing the styrene through the column was found to reduce the catechol concentration to less than 1 ppm and the moisture to ~10 ppm.

Polymer Treatment

The polymer solution was collected in a stainless steel bowl and was treated in a water bath at 98° C. to remove unreacted styrene and solvent. The small amount of antioxidant was added. The ES polymers were then dried in a vacuum oven for at least 4 hrs at about 80° C. Polymerization activities were calculated based on the weight of the polymer produced, the concentration of the catalyst and the duration of the reaction.

Method for a PS (Atactic Polystyrene) Removal

Determination of methyl ethyl ketone (MEK) soluble and insoluble fractions for ES copolymers: 1 g of ES copolymer was dissolved in 15 mL of toluene at room temperature overnight. The solution was heated to 100° C. for 1–2 hrs, and then 300 mL of MEK at 60° C. was added. The solution was cooled to –74° C. and left overnight. MEK soluble and insoluble fractions were collected for further analysis.

Instruments

FT-IR was conducted using a Nicolet Model 750 Magna IR spectrometer.

DSC was conducted using a Perkin Elmer Pyris 1 DSC instrument. The starting temperature was –50° C. and a heating rate of 10° C. per minute was used. The sample was then cooled at 10° C. per minute. A second heating cycle was used to collect the data.

$I_2$ (melt index) was measured at 190° C. with 2.16 kg of weight using a Tinius Olsen MP993. (ASTM number for $I_2$ measurement is D2839-96)

The molecular weights and molecular weight distributions of ethylene-styrene copolymers were determined by GPC (Water 150 C.) with an online viscometer and a FTIR detector. ES copolymer solutions were prepared by dissolving samples in tetrachloroethylene (TCE) at 90° C. The solutions were transferred with a Pasteur pipette to a 4-ml GPC vial and placed in the GPC autosampler carousel for analysis. The infrared spectra were acquired using a Nicolet Magna 750 FTIR spectrophotometer equipped with OMNIC series operating software and with a DTGS detector that was continually purged with nitrogen from which water and $CO_2$ had been removed. The spectra were acquired in the absorbance mode and were background corrected against pure solvent. The differential and inlet pressures were acquired using a Viscotek DM400 Data Manager with TriSEC data acquisition software.

Polymers were analyzed by $^{13}C$ NMR spectroscopy at 125° C. using a Bruker DPX300 spectrometer operating at 75.47 MHz. Samples were prepared at 5–15 wt % in 10 mm NMR tubes using 1,1,2,2-tetrachloroethane-d2 as the lock solvent. The spectrometer was operated using the following parameters: spectral width, 15,000 Hz; pulsewidth, 90°; acquisition time, 2.72 seconds; delay, 7.28 seconds; decoupling, bilevel composite pulse decoupling; file size, 64K data pts; linebroadening, 1–2 Hz; number of scans, 8000.

Chemical shifts are based on the i solated methylene backbone resonance occurring at 30.0 ppm versus TMS. This was achieved by referencing the central peak of the 1,1,2,2-tetrachloroethane-d2 to 74.4 ppm.

Distortionless Enhanced Polarization Transfer (DEPT) experiments were performed using a standard DEPT-135 pulse sequence. All methyl and methine carbons appeared as positive peaks while the methylene carbons generated negative peaks.

General Description for Examples 1–9

Polymerization experiments were carried out using a 500 mL Autoclave solution semi-batch reactor equipped with an air driven stirrer and an automatic temperature control system. All the chemicals (solvent, styrene, catalyst and cocatalyst) were fed into the reactor batchwise, except ethylene, which was fed on demand. There was no removal of product during the polymerization reaction. All the feed streams were purified before entering the reactor using various absorption media to remove catalyst-killing impurities such as water, oxygen, sulfur and polar materials as are known to those skilled in the art. All components were stored and manipulated under an atmosphere of purified argon or nitrogen. The reactor uses a programmable logic control (PLC) system with Wonderware 5.1 software for the process control.

EXAMPLES

Example 1

136 mL of dry cyclohexane and 85 mL of dry styrene were charged along with 6.48 mmol of MAO solution into the reactor. The inner temperature was raised to 90° C. with stirring. Ethylene was introduced to maintain 70 psig during the polymerization reaction. About 12.5 mL of a toluene solution containing a mixture of $CpTiNPiPr_3Me_2$ where iPr is isopropyl (25.9 umol) and $[CPh_3][B(C_6F_5)_4]$ (27.2 umol)) and MAO solution (0.518 mmol of Al) was added to the reactor from a catalyst tank installed above the reactor. The temperature increased to 93° C. initially and was brought back to 90° C. within 1 minute by the cooling system. Polymerization was carried out for 15 minutes. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed. Yield=30.8 g of polymer. Polymerization activity=4689 g polymer/mmolcat*hr; $I_2$=15.1 g/10 min.; Styrene content=35 wt % determined by FT-IR; Tg=-23° C. and Tm=65° C. with a very broad melting point. Mw=74000 with PD=3.2.

Example 2

Polymerization and post reactor treatment were carried out in the same manner as in Example 1 under the conditions shown in Table 4. This was a duplicate experiment. The temperature increased to 95° C. initially upon the addition of the catalyst system and was brought back to 90° C. within 8 minutes by the cooling system. Polymerization was carried out for 11 min. Yield=28.8 g; Polymerization activity=6025 g polymer/mmolcat*Hr; $I_2$=9.3 g/10 min.; Styrene content=33.4 wt % determined by FT-IR; Tg=-14° C. and Tm=66.8° C. with a very broad melting point. Mw=77000 with PD=3.2.

Example 3

Polymerization and post reactor treatment were carried out in the same manner as in Example 1 under the conditions shown in Table 4. The catalyst used in this experiment was $CpTiNPCy_3Me_2$ where Cy is cyclohexyl. The polymerization temperature increased to 94° C. initially upon the addition of the catalyst system and was brought back to 90° C. within 2 minutes by the cooling system. Polymerization was carried out for 20 min. Yield=31.0 g; Polymerization activity=3591 g polyrner/mmolcat*hr; $I_2$=3.8 g/10 min.; Styrene content=38.8 wt % determined by FT-IR; Tg=-20° C. and Tm=69.7° C. with a very broad melting point. Mw=107,000 with PD=2.7.

Example 4

Polymerization and post reactor treatment were carried out in the same manner as in Example 1 under the conditions shown in Table 4. 170 mL of styrene and 51 mL of cyclohexane were added along with 1.08 mmol of MAO solution into the reactor. The temperature increased to 93° C. initially upon the addition of the catalyst system and was brought back to 90° C. within 1 minute by the cooling system. Polymerization was carried out for 17 min. Yield=38.7 g; Polymerization activity=5240 g polymer/mmolcat*hr; $I_2$=20.3 g/10 min.; Styrene content=44.7 wt % determined by FT-IR; Tg=-19° C. with no melting point. Mw=64,000 with PD=2.9.

Example 5

Polymerization and post reactor treatment were carried out in the same manner as in Example 1 under the conditions shown in Table 4. 170 mL of styrene and 51 mL of cyclohexane were added along with 1.08 mmol of MAO solution into the reactor. The catalyst used for this example was $CpTiNPCy_3Me_2$. The temperature increased to 93° C. initially upon the addition of the catalyst system and was brought back to 90° C. within 8 minutes by the cooling system. Polymerization was carried out for 20 min. Yield= 47.5 g; Polymerization activity=5493 g polymer/ mmolcat*hr; $I_2$=20.9 g/10 min.; Styrene content=54.2 wt % determined by FT-IR; Tg=-4.3° C. with no melting point. Mw=62,000 with PD=3.0.

Example 6

136 mL of dry cyclohexane and 85 mL of dry styrene were charged along with 0.216 mmol of MAO solution into the reactor. The inner temperature was raised to 90° C. with stirring. Ethylene was introduced to maintain 70 psig during the polymerization reaction. About 12.5 mL of a toluene solution containing a mixture of $CpTiNPCy_3Cl_2$ (4.3 umol) and $[CPh_3][B(C_6F_5)_4]$ (4.5 umol) ) and MAO solution (172 umol of Al) was added to the reactor from a catalyst tank installed above the reactor. After injection of the catalyst, there was no reaction temperature increase. Polymerization was carried out for 30 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos168 were added. The polymer was dried under reduced pressure at 80° C. until no weight change was observed. Yield=30.0 g of polymer. Polymerization activity=13366 g polymer/ mmolcat*hr; $I_2$=0.77 g/10 min.; Styrene content=37.2 wt % determined by FT-IR; Tg=-21° C. and Tm=65° C. with a very broad melting point.

Example 7

136 mL of dry cyclohexane and 80 mL of dry styrene were charged along with 0.216 mmol of MAO solution into the reactor. The inner temperature was raised to 75° C. with stirring. Ethylene was introduced to maintain 64 psig during the polymerization reaction. About 12.5 mL of a toluene solution containing a mixture of $CpTiNPCy_3Cl_2$ (6.5 umol) and $[CPh_3][B(C_6F_5)_4]$ (6.8 umol) ) and MAO solution (260 umol of Al) was added to the reactor from a catalyst tank installed above the reactor. The reaction temperature increased to 79° C. initially upon the addition of the catalyst system and was brought back to 75° C. within 5 minutes by the cooling system. Polymerization was carried out for 30 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed. Yield=33.6 g; Polymerization activity=10369 g polymer/mmolcat*hr; $I_2$=4.49 g/10 min.; Styrene content=55.2 wt % determined by FT-IR; Tg=-9.1° C. and Tm=60° C. with a broad melting point.

Example 8

136 mL of dry cyclohexane and 81 mL of dry styrene were charged along with 0.216 mmol of MAO solution into the reactor. The inner temperature was raised to 60° C. with stirring. Ethylene was introduced to maintain 52 psig during the polymerization reaction. About 12.5 mL of a toluene solution containing a mixture of $CpTiNPCy_3Cl_2$ (8.6 umol) and $[CPh_3][B(C_6F_5)_4]$ (9.1 umol)) and MAO solution (346 umol of Al) was added to the reactor from a catalyst tank installed above the reactor. The temperature increased to 62° C. initially upon the addition of the catalyst system and was brought back to 60° C. within 1 minute by the cooling system. Polymerization was carried out for 30 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed Yield=10.9 g; Polymerization activity=4302 g polymer/mmolcat*hr; $I_2$=0.19 g/10 min.; Styrene content=61.4 wt % determined by FT-IR; Tg=–18° C. and Tm=60° C. with a broad melting point.

Comparative Example 9

136 mL of dry cyclohexane and 85 mL of dry styrene were charged along with 1.08 mmol of PMAO-IP into the reactor. The inner temperature was raised to 90° C. with stirring. Ethylene was introduced to maintain 70 psig during the polymerization reaction. About 12.5 mL of a toluene solution containing a mixture of $Me_4C_5TiSiMe_2NtBuMe_2$ (25.9 umol) and $B(C_6F_5)_3$ (38.9 umol)) and PMAO-IP (0.518 mmol of Al) was added to the reactor from a catalyst tank installed above the reactor. The temperature increased to 95° C. initially and was brought back to 90° C. within 3 minutes by the cooling system. Polymerization was carried out for 30 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed. Yield=31.9 g of polymer. Polymerization activity=2438 g polymer/mmolcat*hr; $I_2$=5.6 g/10 min.; Styrene content=53.1 wt % determined by FT-IR; Tg=–7.2° C. with no melting point.

General Description for Examples 10 to 17

Polymerization reactions were carried out using a 2000 ml Parr reactor. All the chemicals (solvent, styrene, catalyst and cocatalyst) were fed into the reactor batchwise except ethylene, which was fed on demand. The ethylene was controlled using a Hasting mass flow controller set at 10 standard liter per minute (slpm) as the maximum feeding rate. All reaction components were stored and manipulated under an atmosphere of purified argon. Purified hexane was used as the solvent for the reaction. The reaction was monitored using the Labtech Notebook software. Temperature control was achieved through the use of an automated temperature control system.

Example 10

400 mL of dry hexane and 500 mL of dry styrene were charged along with 4.5 mmol of MAO solution into the reactor. The inner temperature was raised to 90° C. with stirring. Ethylene was introduced to maintain 100 psig during the polymerization reaction. About 4 mL of a toluene solution containing a mixture of $CpTiNPCy_3Cl_2$ (18 umol) and $[CPh_3][B(C_6F_5)_4]$ (18.9 umol) and MAO solution (0.72 mmol of Al) was added to the reactor from a catalyst tank installed above the reactor. The temperature increased to 92° C. and the reaction had an average run temperature of 93.8° C. Polymerization was carried out for 9 minutes. After the polymerization, 5 mL of methanol was injected into the reactor to stop the reaction. The obtained polymer solution was treated in a water bath to remove unreacted styrene and solvent. 500 ppm of antioxidant (Irganox-1076) and 500 ppm Irgafos 168 were added. The polymer was dried under reduced pressure at 80° C. until no weight change was observed. Yield=149.4 g of polymer. Polymerization activity=49796 g polymer/mmolcat*hr; $I_2$=17.4 g/10 min.; Styrene content=46.9 wt % determined by FT-IR; Tg=–18.4° C. and Tm=52° C. with a broad melting point. Mw=105,000 with PD=3.9.

Example 11

Polymerization and post reactor treatment were carried out in the same manner as in Example 10 under the conditions shown in Table 5. The catalyst was run at ⅕ the level of catalyst used in Example 10. There was no temperature increase upon catalyst addition. Polymerization was carried out for 60 min. Yield=66.5 g; Polymerization activity=18336 g polymer/mmolcat*hr; $I_2$=0.884 g/10 min.; Styrene content=40.6 wt % determined by FT-IR; Tg=–15.9° C. and Tm=74.6° C. with a very broad melting.

Example 12

Polymerization and post reactor treatment were carried out in the same manner as in Example 10 under the conditions shown in Table 5, except 5 psig of $H_2$ was added from a 150 mL of shot-tank into the polymerization solution before the run started. There was no temperature increase upon addition of catalyst and the average run temperature was 89° C. Polymerization was carried out for 11 min. Yield=130.9 g; Polymerization activity=39373 g polymer/mmolcat*hr; $I_2$=14.0 g/10 min.; Styrene content=49.6 wt % determined by FT-IR; Tg=–18.7° C. and Tm=54° C. with a very broad melting point.

Example 13

400 mL of dry hexane and 475 mL of dry styrene were charged along with 4.5 mmol of MAO solution into the reactor. The inner temperature was raised to 75° C. with stirring. Ethylene was introduced to maintain 80 psig during the polymerization reaction. About 4 mL of a toluene solution containing a mixture of $CpTiNPCy_3Cl_2$ (9.0 umol) and $[CPh_3][B(C_6F_5)_4]$ (9.5 umol) and MAO solution (0.36 mmol of Al) was added to the reactor from a catalyst tank installed above the reactor. The temperature increased to 77° C. upon the catalyst addition and the average run temperature was 75.2 C. Polymerization was carried out for 55 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed. Yield=148.8 g of the polymer. Polymerization activity=18889 g polymer/mmolcat*hr; $I_2$=2.35 g/10 min.; Styrene content=52.3 wt % determined by FT-IR; Tg=–19.0° C. and Tm=43° C. with a board melting point.

Example 14

400 mL of dry hexane and 455 mL of dry styrene were charged along with 4.5 mmol of MAO solution into the reactor. The inner temperature was raised to 60° C. with stirring. Ethylene was introduced to maintain 65 psig during the polymerization reaction. About 4 mL of a toluene solution containing a mixture of $CpTiNPCy_3Cl_2$ (9.0 umol) and $[CPh_3][B(C_6F_5)_4]$ (9.5 umol) and MAO solution (0.36 mmol of Al) was added to the reactor from a catalyst tank installed above the reactor. The temperature increased to 64° C. upon catalyst addition and the average run temperature was 60.1° C. Polymerization was carried out for 60 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm Irgafos 168 were added. The polymer was dried under reduced pressure at 80° C. until no weight change was observed. Yield=99.7 g of polymer. Polymerization activity=11500 g polymer/mmolcat*hr; $I_2$=1.46 g/10 min.; Styrene content=64.1 wt % determined by FT-IR; Tg=−18.6° C. and Tm=33° C. with a board melting point.

Example 15

Polymerization and post reactor treatment were carried out in the same manner as in Example 10 under the conditions shown in Table 5, except the catalyst system used in this experiment was $CpTiNPCy_3Me_2$ (58.5 umol) and $[CPh_3][B(C_6F_5)_4]$ (61.4 umol). The temperature increased to over 100° C. upon catalyst addition and the average run temperature was 92.6° C. Polymerization was carried out for 9 minutes. Yield=169.0 g; Polymerization activity=19403 g polymer/mmolcat*hr; $I_2$=61.5 g/10 min.; Styrene content= 45.5 wt % determined by FT-IR; Tg=−24.4° C. and Tm=49.9° C. with a very broad melting point.

Example 16

Polymerization and post reactor treatment were carried out in the same manner as in Example 10 under the conditions shown in Table 5. The catalyst system used in this experiment was $CpTiNPCy_3Cl_2$ (90 umol) and MAO solution (27 mmol). The temperature increased to over 100° C. upon catalyst addition and the average run temperature was 98.1° C. Polymerization was carried out for 9 minutes Yield=142.8 g; Polymerization activity=15728 g polymer/mmolcat*hr; $I_2$=461.4 g/10 min.; Styrene content=50 wt % determined by FT-IR; Tg=−8.7° C. with no melting point.

Comparative Example 17

400 mL of dry hexane and 500 mL of dry styrene were charged along with 6.3 mmol of PMAO-IP into the reactor. The inner temperature was raised to 90° C. with stirring. Ethylene was introduced to maintain 100 psig during the polymerization reaction. About 4 mL of a toluene solution containing a mixture of $3\text{-PhIndTiSiMe}_2NtBu_2Me_2$ (58.5 umol) and $B(C_6F_5)_3$ (87.8 umol) and MAO solution (1.17 mmol of Al) was added to the reactor from a catalyst tank installed above the reactor. There was no temperature increase upon catalyst addition. Polymerization was carried out for 60 min. After the polymerization, 5 mL of methanol was injected into the reactor to stop the reaction. The obtained polymer solution was treated in a water bath to remove unreacted styrene and solvents. 500 ppm of antioxidant (Irganox-1076) and 500 ppm I 168 were added. Polymer was dried under a reduced pressure at 80° C. until no weight change was observed. Yield=62.3 g of polymer. Polymerization activity=1033.4 g polymer/mmolcat*hr; $I_2$=1.10 g/10 min.; Styrene content=65.5 wt % determined by FT-IR; Tg=4.5° C. with no melting point. Mw=120,000 with PD=4.7.

TABLE 4

Polymerization summary of Examples 1–9

| Example # | run # | Catalyst system | Average Reaction temperature (° C.) | Ratio of St/C2 mol/mol | Activity (g polymer/ mmolcat * hr) | MI ($I_2$) g/10 min | St (wt %) | Tg/Tm (° C.) |
|---|---|---|---|---|---|---|---|---|
| Example 1 | polymer of Example 1 | $CpTiNPiPr_3Me_2$/tritylborate | 90.4 | 12 | 4689 | 15.1 | 35 | (−23/60.5 broad) |
| Example 2 | 11418 | $CpTiNPiPr_3Me_2$/tritylborate | 92.6 | 12 | 6025 | 9.3 | 33.4 | (−14/66.8 broad) |
| Example 3 | 11417 | $CpTiNPCy_3Me_2$/tritylborate | 90.1 | 12 | 3591 | 3.8 | 38.8 | (−20/69.7 broad) |
| Example 4 | 11450 | $CpTiNPiPr_3Me_2$/tritylborate | 90.1 | 24 | 5240 | 20.3 | 44.7 | (−19/no melting) |
| Example 5 | 11451 | $CpTiNPCy_3Me_2$/tritylborate | 90.0 | 24 | 5493 | 20.9 | 54.2 | (−4.3/no melting) |
| Example 6 | 11494 | $CpTiNPCy_3Cl_2$/MAO solution/tritylborate | 90.1 | 12 | 13366 | 0.77 | 37.2 | (−21/65 broad) |
| Example 7 | 11495 | $CpTiNPCy_3Cl_2$/MAO solution/tritylborate | 75.2 | 12 | 10362 | 4.49 | 55.2 | (−9.1/60 broad) |
| Example 8 | 11496 | $CpTiNPCy_3Cl_2$/MAO solution/tritylborate | 60.2 | 12 | 4302 | 0.19 | 61.4 | (−18/no melting) |
| Example 9 | 11411 | $Dow\text{-}Me_2/B(C_6F_5)_3$ | 89.9 | 12 | 2438 | 5.6 | 53.1 | (−7.2 C./no melting) |

TABLE 5

Polymerization summary of Examples 10–17

| Example # | Run # | Catalyst system | Hydrogen added (Δpsig) | Average run Temp (° C.) | Activity (g polymer/ mmolcat * hr) | MI ($I_2$) g/10 min | St Wt % | Tg/Tm (° C.) |
|---|---|---|---|---|---|---|---|---|
| Example 10 | 62496 | $CpTiNPCy_3Cl_2$/MAO solution/tritylborate | | 93.8 | 49796 | 17.4 | 46.9 | −18.4/51.7 (broad) |
| Example 11 | 62569 | $CpTiNPCy_3Cl_2$/MAO solution/tritylborate | | ~90 | 18336 | 0.884 | 40.6 | −15.9/74.6 (broad) |

TABLE 5-continued

Polymerization summary of Examples 10–17

| Example # | Run # | Catalyst system | Hydrogen added (Δpsig) | Average run Temp (° C.) | Activity (g polymer/ mmolcat * hr) | MI (I$_2$) g/10 min | St Wt % | Tg/Tm (° C.) |
|---|---|---|---|---|---|---|---|---|
| Example 12 | 62497 | CpTiNPCy$_3$Cl$_2$/MAO solution/tritylborate | 5 | 89.0 | 39373 | 14.0 | 49.6 | −18.7/54 (broad) |
| Example 13 | 62576 | CpTiNPCy$_3$Cl$_2$/MAO solution/tritylborate | | 75.2 | 18889 | 2.35 | 52.3 | −19.0/43.0 (broad) |
| Example 14 | 62578 | CpTiNPCy$_3$Cl$_2$/MAO solution/tritylborate | | 60.1 | 11500 | 1.462 | 64.1 | −18.6/33 (broad) |
| Example 15 | 62495 | CpTiNPCy$_3$Me$_2$/ tritylborate | | 92.6 | 19403 | 61.5 | 45.5 | −24.4/49.9 (broad) |
| Example 16 | 62493 | CpTiNPCy$_3$Cl$_2$/MAO solution | | 98.1 | 15728 | 461.4 | 50.0$^a$ | −8.7/no melting |
| Example 17 | 62502 | Dow-1-Me$_2$/B(C$_6$F$_5$)$_3$ | | 90.1 | 1033 | 1.10 | 65.5 | 4.5/no melting |

Note:
all polymerizations were carried out under styrene to ethylene molar ratio of 12:1
$^a$In Example 16, the polymer was too soft to make a plaque and styrene content was estimated by solution FT-IR

What is claimed is:

1. An interpolymer comprising:
   1) from 30 to 70 weight % of one or more monomers selected from the group consisting of C$_{2-10}$ aliphatic alpha olefins;
   2) from 70 to 30 weight % of one or more monomers selected from the group consisting of C$_{8-20}$ vinyl aromatic monomers which are unsubstituted or substituted by one or more substituents selected from the group consisting of C$_{1-4}$ alkyl radicals; and optionally
   3) from 0 to 10 weight % of one or more monomers selected from the group consisting of C$_{5-9}$ non conjugated diolefins, wherein said interpolymer;
      i) contains one or more blocks of three vinyl aromatic monomers in a head to tail to tail insertion fashion (manner) characterized by having a $^{13}$C NMR ratio of the areas under the peaks at 38 ppm to 44 ppm of less than 2:1 and multiple peaks between 34 and 35 ppm.

2. The interpolymer according to claim 1 wherein the vinyl aromatic monomer is present in an amount from 60 to 40 weight %.

3. The interpolymer according to claim 1 wherein the alpha olefin monomer is present in an amount from 40 to 60 weight %.

4. The interpolymer according to claim 3, wherein the vinyl aromatic monomer is selected from the group consisting of styrene, alpha methyl styrene, and para methyl styrene.

5. The interpolymer according to claim 4, wherein the alpha olefin is selected from the group consisting of ethylene, propylene, butene, hexene, and octene.

6. The interpolymer according to claim 5, having a weight average molecular weight from 10,000 to 500,000.

7. The interpolymer according to claim 6, wherein the non-conjugated diolefin is absent.

8. The interpolymer according to claim 7, wherein the vinyl aromatic monomer is styrene.

9. The interpolymer according to claim 8, wherein the alpha olefin is selected from the group consisting of ethylene and propylene.

10. The interpolymer according to claim 6, wherein the non conjugated diolefin is present in an amount from 5 to 10 weight %.

11. The interpolymer according to claim 10, wherein the vinyl aromatic monomer is styrene.

12. The interpolymer according to claim 11, wherein the alpha olefin is selected from the group consisting of ethylene and propylene.

13. The interpolymer according to claim 12, wherein the non-conjugated diolefin is selected from the group consisting of hexadiene and ethylidene norbornene.

14. The interpolymer according to claim 13, wherein the diene is 1,5 hexadiene.

15. A process for preparing an interpolymer according to claim 1, comprising contacting a monomer mixture comprising from 0.8 to 0.6 mole fraction of one or more C$_{8-20}$ vinyl aromatic monomers which are unsubstituted or substituted by one or more substituents selected from the group consisting of C$_{1-4}$ alkyl radicals; from 0.4 to 0.2 mole fraction of one or more monomers selected from the group consisting of C$_{2-10}$ aliphatic alpha olefins and optionally from 0 to 0.1 mole fraction of one or more monomers selected from the group consisting of C$_{5-9}$ non conjugated diolefins with a catalyst comprising a phosphinimine compound of the formula Cp((R$^1$)$_3$P=N)—M—L$_2$ wherein each R$^1$ is independently selected from the group consisting of C$_{3-6}$ alkyl radicals which are unsubstituted or substituted by a heteroatom, provided that there is a carbon phosphorus bond and the CPN bond angle is not less than 108°, Cp is selected from the group consisting of cyclopentadienyl, indenyl and fluorenyl radicals which are unsubstituted or substituted by one or more substitutents selected from the group consisting of C$_{1-6}$ alkyl radicals which are unsubstituted or substituted by one or more fluorine atoms; M is selected from the group consisting of Ti, Zr, and Hf, and each L is independently selected from the group consisting of a halogen atom, a hydrogen atom, a C$_{1-10}$ alkyl radical, a C$_{1-10}$ alkoxide radical, and a C$_{6-10}$ aryl oxide radical, and at least one activator selected from the group consisting of:
   (i) a mixture comprising a complex aluminum compound of the formula R$^2{}_2$AlO(R$^2$AlO)$_m$AlR$^2{}_2$ wherein each R$^2$ is independently selected from the group consisting of C$_{1-20}$ hydrocarbyl radicals and m is from 3 to 50, and a hindered phenol to provide a molar ratio of Al: hindered phenol from 2:1 to 5:1;
   (ii) ionic activators selected from the group consisting of:
      (A) compounds of the formula [R$^3$]$^+$ [B(R$^4$)$_4$]$^-$ wherein B is a boron atom, R$^3$ is a cyclic C$_{5-7}$ aromatic cation or a triphenyl methyl cation and each $R^4$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^5)_3$; wherein each $R^5$ is independently selected from the group consisting of a hydrogen atom and a $C_{1-4}$ alkyl radical; and (B) compounds of the formula $[(R^8)_tZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and (C) compounds of the formula $B(R^4)_3$ wherein $R^4$ is as defined above; and (iii) mixtures of (i) and (ii); in an inert hydrocarbyl medium at a temperature from 20° C. to 150° C. and a pressure from 15 psi to 15000 psi.

16. The process according to claim 15, wherein $R^1$ is a $C_{3-6}$ branched or cyclic alkyl radical.

17. The process according to claim 16, wherein the CPN bond angle is not less than 108.5°.

18. The process according to claim 17, wherein the hindered phenol is a phenol substituted in the 2, 4 and 6 positions by a $C_{2-6}$ alkyl radical.

19. The process according to claim 18, wherein the molar ratio of Al: hindered phenol is from 3.25:1 to 4.50:1.

20. The process according to claim 19 wherein the hindered phenol is 2,6-di-t-butyl-4-ethyl phenol.

21. The process according to claim 20, wherein L is selected from the group consisting of a hydrogen atom, a chlorine atom and a $C_{1-4}$ alkyl radical.

22. The process according to claim 21, wherein $R^2$ is a methyl radical and m is from 10 to 40.

23. The process according to claim 22, wherein Cp is selected from the group consisting of a cyclopentadienyl radical, an indenyl radical and a fluorenyl radical.

24. The process according to claim 23 wherein the pressure is from 50 to 600 psi and the temperature is from 60° C. to 120° C.

25. The process according to claim 24, wherein the activator is a mixture of an aluminum compound and a hindered phenol.

26. The process according to claim 25, wherein the molar ratio of Al to transition metal is from 50:1 to 500:1.

27. The process according to claim 26, wherein M is Ti.

28. The process according to claim 27, wherein $R^1$ is selected from the group consisting of an isopropyl radical and a cyclohexyl radical.

29. The process according to claim 28, wherein Cp is a cyclopentadienyl radical.

30. The process according to claim 24, wherein the activator is an ionic activator.

31. The process according to claim 30, wherein the molar ratio of transition metal to boron is from 1:1 to 1:3.

32. The process according to claim 31, wherein the molar ratio of transition metal to boron is from 1:1.05 to 1:1.20.

33. The process according to claim 32, wherein M is Ti.

34. The process according to claim 33, wherein $R^1$ is selected from the group consisting of an isopropyl radical and a cyclohexyl radical.

35. The process according to claim 34, wherein Cp is a cyclopentadienyl radical.

36. The process according to claim 35, wherein the ionic activator is tritylborate.

37. The process according to claim 24, wherein the activator is a mixture of an aluminum compound together with a hindered phenol and an ionic activator to provide a molar ratio of transition metal: Al:boron from 1:20:1 to 1:120:3.

38. The process according to claim 37, wherein the catalyst system has a molar ratio of transition metal: Al: boron from 1:30:1 to 1:45:1.5.

39. The process according to claim 38, wherein the ionic activator is tritylborate.

40. The process according to claim 39, wherein M is Ti.

41. The process according to claim 40, wherein $R^1$ is selected from the group consisting of an isopropyl radical and a cyclohexyl radical.

42. The process according to claim 41, wherein Cp is a cyclopentadienyl radical.

* * * * *

UNITED STATES PATENT AND TRADEMARK OFFICE
CERTIFICATE OF CORRECTION

PATENT NO. : 6,579,961 B1
DATED : July 17, 2003
INVENTOR(S) : Qinyan Wang et al.

It is certified that error appears in the above-identified patent and that said Letters Patent is hereby corrected as shown below:

<u>Title page,</u>
Item [75], Inventor, correct the name of the fifth named inventor to -- Liangyou Fan --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,579,961 B1                                                             Page 1 of 1
DATED         : June 17, 2003
INVENTOR(S)   : Qinyan Wang et al.

It is certified that error appears in the above-identified patent and that said Letters Patent is hereby corrected as shown below:

<u>Title page,</u>
Item [75], Inventor, correct the name of the fifth named inventor to -- Liangyou Fan --.

This certificate supersedes Certificate of Correction issued October 7, 2003.

Signed and Sealed this

Eleventh Day of November, 2003

JAMES E. ROGAN
*Director of the United States Patent and Trademark Office*